3,228,070
METHOD AND APPARATUS FOR MAKING LENS PATTERNS
John W. Gill, Groton, Conn., assignor to American Optical Company, Southbridge, Mass., a voluntary association of Massachusetts
Filed Oct. 28, 1963, Ser. No. 319,228
7 Claims. (Cl. 22—57)

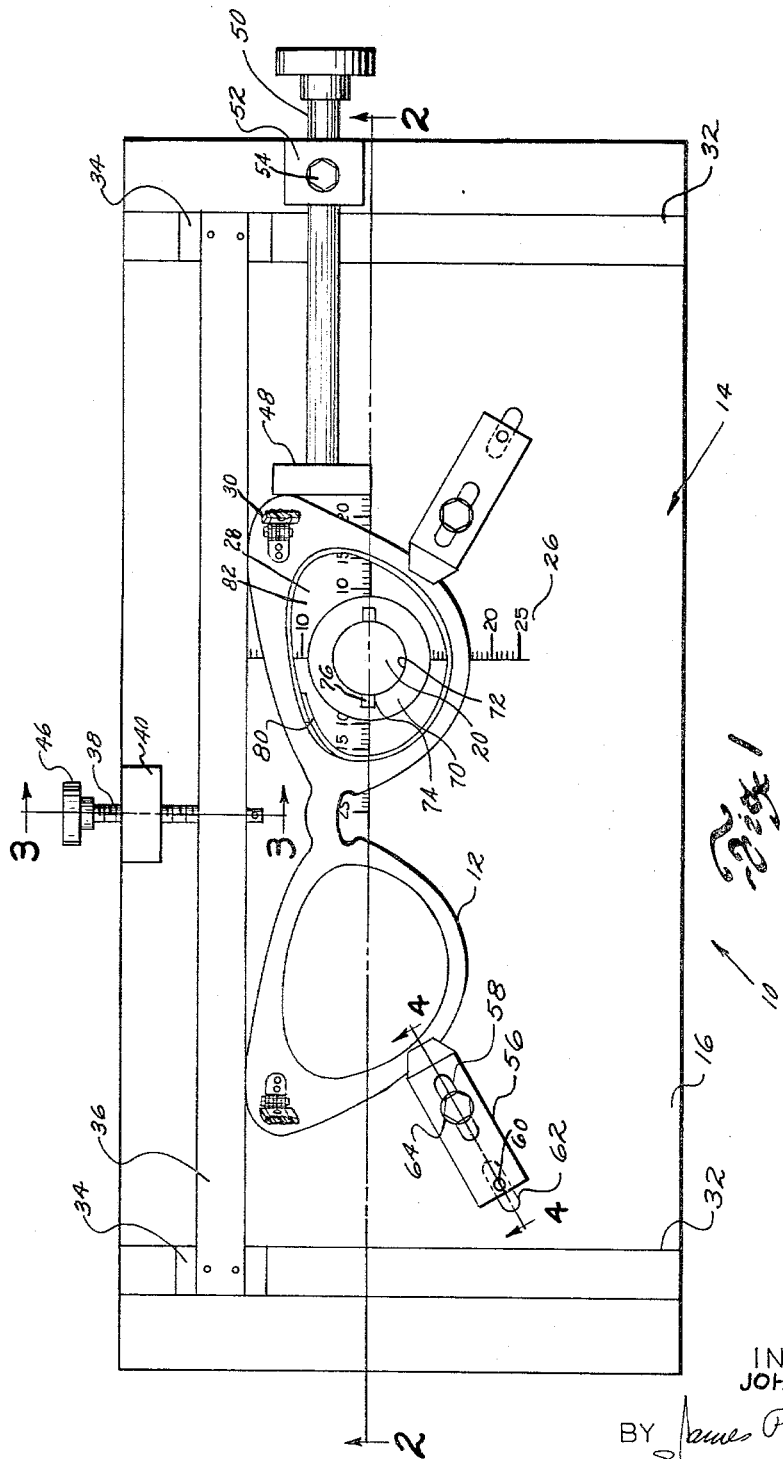

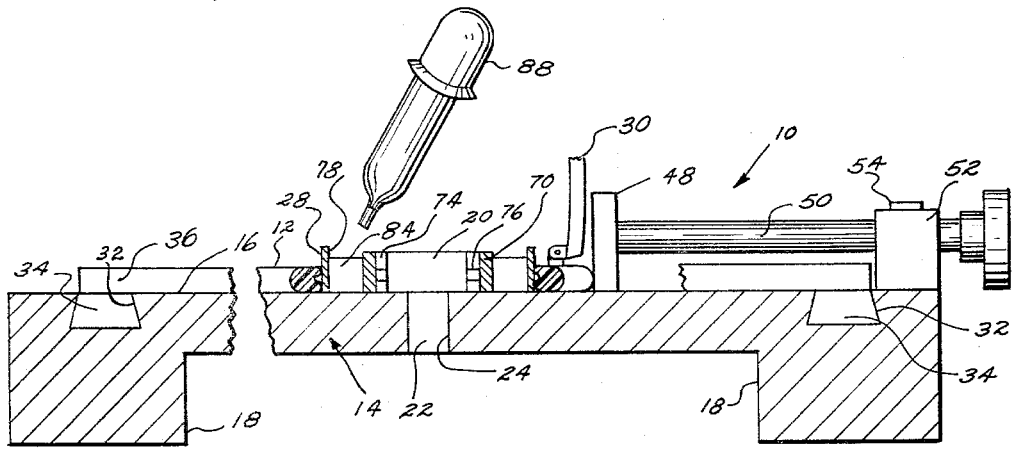
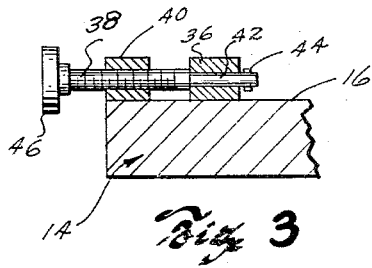
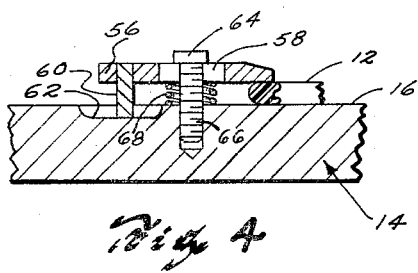
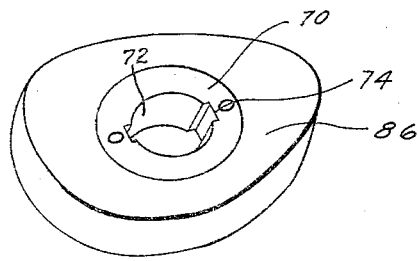

The field of this invention is that of ophthalmic lens manufacture and the invention relates more particularly to novel and improved methods and apparatus for making lens patterns for use in the preparation of lenses to be mounted in ophthalmic frames.

In conventional practice, the manufacturers of ophthalmic lens frames provide lens patterns having outer configurations corresponding to the outer configuration of lenses to be mounted in the frames. These patterns or templates can be used to guide lens cutting and edging machines in preparing finished lenses from lens blanks to fit the frames in the conventional manner illustrated in U.S. Pat. No. 3,119,206. With the great multiplicity of ophthalmic frame designs which are presently being sold, however, opticians are regularly faced with the problem of cutting and edging a replacement lens to fit an ophthalmic frame for which they have no lens pattern immediately available. In this circumstance, the replacement lens must usually be cut and edged by hand in a slow, time-consuming and expensive process. Several systems have been proposed for providing special lens patterns to be used in these situations but, until the present invention, no really advantageous system for preparing replacement lenses has been known.

It is an object of this invention to provide novel and improved methods and apparatus for making lens patterns for ophthalmic frames; to provide such methods and apparatus which can be conveniently employed for making accurate and substantial lens patterns with a minimum of time and expense; to provide such methods and apparatus which can be easily employed in making lens patterns to fit any ophthalmic frame likely to be encountered; to provide such methods and apparatus which can be successfully employed with a minimum of skill and experience; and to provide such methods and apparatus which can be employed for making a lens pattern for a particular frame without risk of injury to the frame.

Briefly described, the method provided by this invention for making a lens pattern for a particular ophthalmic frame includes the step of supporting the frame so that a lens opening thereof extends over a base which is at least coextensive with the lens opening. Preferably, a pattern mounting means can be located within the lens opening. For example, a bushing can be disposed within the lens opening of the frame so that the axis of the bushing extends through the geometrical center of the lens opening and so that one end of the bushing abuts the base beneath the opening. A strip-like lining can then be arranged around the periphery of the lens opening in abutting relation to the base so that the lining and base form the side walls and bottom respectively of an open-ended mold cavity. In this way, a mold cavity can be formed directly inside the lens opening and can have a configuration which closely corresponds to the configuration of the opening. Where the lining comprises a relatively long and thin strip of resilient material which is normally flat or straight, the lining strip can be introduced within the lens opening into edgewise abutting relation with the base in a loosely coiled disposition and can be permitted to uncoil to be readily conformed to the periphery of the lens opening by its inherent resilience. A lens pattern can then be molded within the mold cavity. For example, a metallic material of relatively low melting temperature can be cast within the mold cavity, preferably around a pattern-mounting bushing located within the cavity, for forming a lens pattern having the configuration of the lens opening and for attaching the pattern to the bushing.

The apparatus provided by this invention can include a base member which preferably has a relatively large and flat upper surface and can include means supporting an ophthalmic frame so that a lens opening of the frame extends over the base member. The apparatus can also include a lining, preferably comprising a relatively long and thin strip-like member of resilient material, to be disposed around the periphery of the lens opening in abutting relation to the base member for forming an open-ended mold cavity having the configuration of the lens opening. The apparatus can further include means for introducing moldable material into the mold cavity for forming a lens pattern therein. In a desirable embodiment, the apparatus can include means supporting a bushing or other pattern mounting means within said lens opening to be cast within the pattern formed inside the lens opening. Preferably, also, the base member of the apparatus can have indicia or other aligning means thereon for locating an ophthalmic frame relative to the base member.

Other objects, advantages and details of the methods and apparatus provided by this invention appear in the following detailed description of preferred embodiments of the invention, the detailed description referring to the drawing in which:

FIG. 1 is a plan view of the apparatus of this invention;
FIG. 2 is a section view along line 2—2 of FIG. 1;
FIG. 3 is a section view along line 3—3 of FIG. 1;
FIG. 4 is a section view along line 4—4 of FIG. 1; and
FIG. 5 is a perspective view of a lens pattern made in accordance with this invention.

Referring to the drawings, 10 in FIGS. 1–4 indicates the pattern molding apparatus of this invention which can be used to make a lens pattern for the ophthalmic frame 12. As shown, the apparatus includes a base plate member 14 which can have a relatively large and flat upper surface 16 of sufficient area to easily accommodate any size or design of ophthalmic frame likely to be encountered. Preferably, the base member can have leg portions 18 or the like so that the apparatus can be conveniently placed upon an optician's desk or workbench. In a desirable embodiment, the base member can be formed of stainless steel or other material of relatively high heat conductivity.

A centering or locating post 20 can be secured to the base plate 14 in any conventional manner so that the post extends upwardly from the base plate surface 16. For example, as shown in FIG. 2, the post can have a portion 22 of reduced diameter which is held with a force fit within a matching hole 24 in the base plate. Preferably indicia 26 can be scribed or otherwise marked on the base member surface 16 for indicating distances radially outward from the center of the post 20.

In accordance with this invention, the ophthalmic frame 12 can be arranged so that a lens opening 28 of the frame can fit around the post 20 and can extend in a substantially horizontal plane over the base member surface 16. That is, the frame can be placed with the front of the frame resting against the base surface 16 so that the temple pieces 30 of the frame extend upwardly. The location of the frame 12 on the base surface can then be adjusted by reference to the indicia 26 until the locating post 20 extends through the geometrical center of the lens opening 28.

In a practical construction of the apparatus 10, aligning means can be provided on the base member 14 for facilitating centering of the lens opening 28 around the post 20. For example, slideways 32 can be formed in the base member 14 to accommodate matching slides 34, and an aligning bar 36 can be attached to the slides in a conventional manner. An adjusting stud 38 can be threadedly engaged in a block 40 secured to the base member and can have a portion 42 of reduced diameter rotatably secured to the aligning bar 36 by means of a pin 44 as shown particularly in FIG. 3. As will be understood, the stud 38 can be rotated by a knurled knob 46 secured to the stud for moving the aligning bar 36 back and forth on the base member. Another aligning bar 48 can have a shaft 50 extending with a sliding fit through an aperture in a block 52 secured to the base member and can have set screw means 54 for locking the aligning bar 48 in any selected position of adjustment on the base member 14 as will be understood. In this construction, the frame 12 can be placed with the lens opening 28 around the post 20 and can be abutted against the aligning bars 36 and 48, the bars being adjusted until the lens opening is centered on the post 20 as indicated by the indicia 26.

When the ophthalmic frame 12 has been located upon the base member 14 as described, clamp means 56 can secure the frame in its selected position. For example, as shown particularly in FIGS. 1 and 4, each clamp means 56 can comprise a short bar which has a longitudinal slot 58 therein and which has a dowel or pin 60 extending downwardly therefrom to be received within a matching groove 62 formed in the base plate 14. A screw 64 can extend through the slot to threadedly engage the base member 14 as at 66, and a helical coil spring 68 or the like can be fitted around the screw. In this construction, the slot 58 and groove 62 can permit the bar 56 to be moved back and forth so that an end of the bar can be fitted over the frame 12. The screw 64 can then be tightened for clamping the frame 12 against the base plate 14.

Preferably a mounting means for a lens pattern can be located within the lens opening 28. For example, it will be understood that a lens cutting or edging machine of particular design (not shown) may have an arbor which can fit through a central bore in a lens pattern for mounting the pattern in the machine during cutting or edging of a lens. In such a case according to this invention, a pattern mounting means located in the lens opening 28 can comprise a preformed bushing 70 having a central bore 72 which is of suitable diameter to be received upon the arbor of said lens cutting or edging machine. The bushing can be fitted over the bushing locating post 20 to abut one end of the bushing against the base member surface 16, the post 20 being of a suitable diameter for snugly receiving the bushing thereon. If the bushing 70 requires notches 74 or the like for use in mounting the bushing on the noted arbor, the post 20 can have a pin 76 or the like therethrough for fitting into the bushing notches, thereby to locate the bushing more securely on the post. The bushing 70 would preferably be formed of steel or the like but could also be formed of other metals or plastics and the like within the scope of this invention.

In accordance with this invention, a lining 78 can be arranged within the lens opening 28 to conform to the periphery of the opening and to abut the surface 16 of the base member beneath the lens opening. The lining can be formed of any paper, plastic or metal material or the like which can be smoothly conformed to the periphery of the lens opening. Preferably, however, the lining comprises a relatively long, narrow and thin strip-like member of a somewhat resilient material, the member being normally adapted to be flat. This lining strip can be disposed within the lens opening 28 in a loosely coiled disposition to be engaged in edgewise abutting relation to the surface 16 of the base member. The lining strip can then be permitted to uncoil as far as it can within the lens opening in response to the natural resilience of the material, whereby the lining strip can be closely conformed to the peripheral configuration of the lens opening. The lining strip can be overlapped within the lens opening as indicated at 80, particularly where the lining strip is of a thickness of about .002 inch or the like. However, if desired, the strip can be trimmed within the lens opening 28 for removing any overlapping strip material. It will be noted that the strip material will tend to remain in straight upstanding relation to the base surface 16 as shown in FIG. 2.

It will be understood that the lining strip 78 and the surface 16 of the base member cooperate to form the side walls and bottom respectively of an open-ended mold cavity 82 having a configuration which closely corresponds to the configuration of the lens opening 28. It will also be understood that where the lens opening 28 has been centered upon the locating post 20, the bushing 70 mounted on the post can be located at the center of the mold cavity. In accordance with this invention, a moldable material 84 can be cast within the mold cavity 82 around the bushing 70 thereby to form a lens pattern 86 having the configuration of the lens opening 28 and to attach the pattern to the bushing as a pattern mounting means. The moldable material can comprise any suitable material adapted to assume the shape of the mold cavity and to be hardened or cured within the cavity for retaining said cavity configuration. Preferably, however, the moldable material 84 can comprise a plastic or metallic material of relatively low melting temperature which can be melted by any conventional means (not shown) and which can be conveniently introduced into the mold cavity by means of a dropper 88 or the like. For example, the material 84 can comprise a low melting solder lead, or other metallic alloy having a melting temperature of approximately 200° F. or less which can be cast within the mold cavity 82 without injuring the materials of the ophthalmic frame 12.

When the moldable material 84 has been cast and hardened within the mold cavity 82, the lens pattern 86 thus formed can be removed from within the mold cavity. See FIG. 5. As shown this lens pattern can have an outer configuration closely corresponding to the configuration of the lens opening 28 and can have a bushing 70 with a central bore 72 adapted to be received in a lens cutting or edging machine. It should be understood that pattern mounting means, other than the bushing 70, could be located in the mold cavity 82 to be cast within a lens pattern 86 within the scope of this invention. It should also be understood that the methods and apparatus for making lens patterns described herein have been described by way of illustration and that this invention includes all modifications and equivalents of the described methods and apparatus which fall within the scope of the appended claims.

I claim:
1. Apparatus for making a lens pattern for an ophthalmic frame comprising:
   a base member;
   means supporting said ophthalmic frame with a lens opening thereof extending over said base member;
   a lining strip of selected width disposed around the periphery of said lens opening with one strip edge in abutting relation to said base member and with the other strip edge extending above frame portions adjacent said lens opening for forming an open-ended mold cavity having a configuration which corresponds to that of said lens opening; and
   means for introducing moldable material into said mold cavity for forming said lens pattern within said cavity.

2. Apparatus for making a lens pattern for an ophthalmic frame comprising:
- a base member;
- means supporting said ophthalmic frame with a lens opening thereof extending over said base member;
- means supporting pattern mounting means within said lens opening;
- a lining strip of selected width disposed around the periphery of said lens opening with one strip edge in abutting relation to said base member and with the other strip edge extending above frame portions adjacent said lens opening for forming an open-ended mold cavity having a configuration which corresponds to that of said lens opening; and
- means for introducing moldable material into said mold cavity around said pattern mounting means for forming said lens pattern within said cavity and for attaching said pattern to said mounting means.

3. Apparatus for making a lens pattern for an ophthalmic frame comprising:
- a base member having a substantially flat upper surface;
- a bushing locating-post extending upwardly from said base surface so that a bushing can be fitted around said post and abutted with said base surface, said post having means adapted to fit within notches on said bushing for radially orienting said bushing on said post;
- means supporting said ophthalmic frame with a lens opening of the frame extending over said base surface to surround a bushing fitted around said post;
- means aligning said frame with said lens opening in selected alignment with said post;
- a relatively long and thin lining strip disposed around the periphery of said lens opening with one strip edge in abutting relation to said base surface and with the other strip edge extending above frame portions adjacent said lens opening for forming an open-ended mold cavity having a configuration which corresponds to that of said lens opening; and
- means for introducing moldable material into said mold cavity around a bushing fitted around said post for forming a lens pattern within said cavity and for attaching said pattern to said bushing.

4. A method for making a lens pattern for an ophthalmic frame, said method comprising the steps:
- supporting the frame so that a lens opening of the frame extends in a substantially horizontal plane over a base member which is at least coextensive with said lens opening;
- arranging a strip-like lining around the periphery of said opening in abutting relation to said base member for forming an open-ended mold cavity having a configuration which corresponds to that of said opening;
- shaping casting material to the configuration of said mold cavity within said cavity; and
- hardening said material to said configuration within said mold cavity for forming a lens pattern.

5. A method for making a lens pattern for an ophthalmic frame, said method comprising as steps:
- disposing the frame so that a lens opening thereof extends in a substantially horizontal plane over an adjacent base member which is relatively larger than said lens opening,
- locating pattern mounting means within said lens opening;
- arranging a lining around the periphery of said opening to abut said base member for forming an open-ended mold cavity having a configuration which corresponds to that of said opening; and
- disposing a casting material in said mold cavity around said pattern mounting means for forming a lens pattern and for attaching said pattern to said mounting means.

6. A method for making a lens pattern for an ophthalmic frame, said method comprising as steps:
- supporting the frame so that a lens opening thereof extends in a substantially horizontal plane over an adjacent relatively larger base member;
- locating pattern mounting means within said lens opening;
- providing a relatively long and thin and normally straight lining strip of resilient material;
- arranging said strip in a loosely coiled disposition within said lens opening so that the strip is conformed to the periphery of said opening by its inherent resilience and so that an edge of the strip abuts said base member for forming an open-ended mold cavity having a configuration which corresponds to that of said opening; and
- casting metallic material in said mold cavity around said pattern mounting means for forming a lens pattern and for attaching said pattern to said mounting means.

7. A method for making a lens pattern for an ophthalmic frame, said method comprising the steps:
- supporting the frame so that a lens opening thereof extends in a substantially horizontal plane over an adjacent relatively large and flat member;
- providing a metallic bushing;
- locating said bushing on said member so that the axis of the bushing extends through the geometrical center of said lens openings and so that an end of said bushing abuts said flat surface;
- providing a relatively long and thin and normally straight lining strip of resilient material;
- arranging said strip in loosely coiled disposition within said lens opening so that the strip is conformed to the periphery of said opening by its inherent resilience and so that an edge of the strip abuts said adjacent member for forming an open-ended mold cavity having a configuration which corresponds to that of said opening; and
- casting metallic material in said mold cavity around said bushing for forming a lens pattern and for attaching said pattern to said bushing.

References Cited by the Examiner

UNITED STATES PATENTS

| 1,681,906 | 8/1928 | Taylor | 22—203 |
| 2,543,332 | 2/1951 | Olsen et al. | 22—113.5 |

MARCUS U. LYONS, *Primary Examiner.*